United States Patent
Levanoni et al.

(10) Patent No.: US 6,732,099 B1
(45) Date of Patent: May 4, 2004

(54) DATA MINING TECHNIQUES FOR ENHANCING DISTRIBUTION CENTERS MANAGEMENT

(75) Inventors: Menachem Levanoni, Yorktown Heights, NY (US); Jerome M. Kurtzberg, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 09/604,535

(22) Filed: Jun. 27, 2000

(51) Int. Cl.[7] .................................. G06F 17/30
(52) U.S. Cl. ........................................ 707/6
(58) Field of Search .................... 707/104.1, 1, 8, 707/100, 102; 705/10; 706/12, 16, 45

(56) References Cited

U.S. PATENT DOCUMENTS

| | | |
|---|---|---|
| 4,947,322 A | 8/1990 | Tenma et al. |
| 5,241,467 A | 8/1993 | Failing et al. |
| 5,712,989 A | 1/1998 | Johnson et al. |
| 5,748,188 A | 5/1998 | Hu et al. |
| 5,774,868 A | 6/1998 | Cragun et al. |
| 5,893,076 A | 4/1999 | Hafner et al. |
| 5,970,482 A | * 10/1999 | Pham et al. ................ 706/12 |

FOREIGN PATENT DOCUMENTS

| WO | WO 00/43934 | 7/2000 |
|---|---|---|

\* cited by examiner

Primary Examiner—Safet Metjahic
Assistant Examiner—Sana Al-hashemi
(74) Attorney, Agent, or Firm—Stephen C. Kaufman, Esq.; McGinn & Gibb, PLLC

(57) ABSTRACT

A computer method for enhancing distribution centers management. The method includes the steps of providing a demand database comprising a compendium of individual demand history; providing a distribution database comprising a compendium of at least one of distribution centers management solutions, distribution centers information, and distribution centers diagnostics; and, employing a data mining technique for interrogating the demand and distribution databases for generating an output data stream, the output data stream correlating a demand problem with a distribution solution.

18 Claims, 4 Drawing Sheets

DATA MINING TECHNIQUES FOR ENHANCING DISTRIBUTION CENTERS MANAGEMENT

BACKGROUND OF THE INVENTION

1. Field of the Invention

This invention relates to methodology for utilizing data mining techniques in the area of distribution centers management.

2. Introduction to the Invention

Data mining techniques are known and include disparate technologies, like neural networks, which can work to an end of efficiently discovering valuable, non-obvious information from a large collection of data. The data, in turn, may arise in fields ranging from e.g., marketing, finance, manufacturing, or retail.

SUMMARY OF THE INVENTION

We have now discovered novel methodology for exploiting the advantages inherent generally in data mining technologies, in the particular field of distribution centers management applications.

Our work proceeds in the following way.

We have recognized that a typical and important "three-part" paradigm for presently effecting distribution centers management, is a largely subjective, human paradigm, and therefore exposed to all the vagaries and deficiencies otherwise attendant on human procedures. In particular, the three-part paradigm we have in mind works in the following way.

First, a distribution center manager develops a demand database comprising a compendium of individual demand history—e.g., the demand's response to historical distribution situations. Secondly, and independently, the distribution center manager develops in his mind a distribution database comprising the distribution center manager's personal, partial, and subjective knowledge of objective retail facts culled from e.g., the marketing literature, the business literature, or input from colleagues or salespersons. Thirdly, the distribution center manager subjectively correlates in his mind the necessarily incomplete and partial distribution database, with the demand database, in order to promulgate a prescribed individual's demand distribution centers management evaluation and cure.

This three-part paradigm is part science and part art, and captures one aspect of the problems associated with distribution centers management. However, as suggested above, it is manifestly a subjective paradigm, and therefore open to human vagaries.

We now disclose a novel computer method which can preserve the advantages inherent in this three-part paradigm, while minimizing its incompleteness and attendant subjectivities that otherwise inure in a technique heretofore entirely reserved for human realization.

To this end, in a first aspect of the present invention, we disclose a novel computer method comprising the steps of:
i) providing a demand database comprising a compendium of demand history;
ii) providing a distribution database comprising a compendium of at least one of distribution centers management solutions, distribution centers information, and distribution centers diagnostics; and
iii) employing a data mining technique for interrogating said demand and distribution databases for generating an output data stream, said output data stream correlating a demand problem with a distribution solution.

The novel method preferably comprises a further step of updating the step i) demand database, so that it can cumulatively track the demand history as it develops over time. For example, this step i) of updating the demand database may include the results of employing the step iii) data mining technique. Also, the method may comprise a step of refining an employed data mining technique in cognizance of pattern changes embedded in each database as a consequence of distribution results and updating the demand database.

The novel method preferably comprises a further step of updating the step ii) distribution database, so that it can cumulatively track an ever increasing and developing technical distribution centers management literature. For example, this step ii) of updating the distribution database may include the effects of employing a data mining technique on the demand database. Also, the method may comprise a step of refining an employed data mining technique in cognizance of pattern changes embedded in each database as a consequence of distribution results and updating the distribution database.

The novel method may employ advantageously a wide array of step iii) data mining techniques for interrogating the demand and distribution databases for generating an output data stream, which output data stream correlates a demand problem with a distribution solution. For example, the data mining technique may comprise inter alia employment of the following functions for producing output data: classification-neural, classification-tree, clustering-geographic, clustering-neural, factor analysis, or principal component analysis, or expert systems.

In a second aspect of the present invention, we disclose a program storage device readable by machine to perform method steps for providing an distribution centers management database, the method comprising the steps of:
i) providing a demand database comprising a compendium of individual demand history;
ii) providing a distribution database comprising a compendium of at least one of distribution centers management solutions, distribution centers information, and distribution centers diagnostics; and
iii) employing a data mining technique for interrogating said demand and distribution databases for generating an output data stream, said output data stream correlating a demand problem with a distribution solution.

In a third aspect of the present invention, we disclose a computer comprising:
i) means for inputting a demand database comprising a compendium of individual demand history;
ii) means for inputting a distribution database comprising a compendium of at least one of distribution centers management solutions, distribution centers information, and distribution centers diagnostics;
iii) means for employing a data mining technique for interrogating said distribution databases;
iv) means for generating an output data stream, said output data stream correlating a demand problem with a distribution solution.

We have now summarized the invention in several of its aspects or manifestations. It may be observed, in sharp contrast with the prior art discussed above comprising the three part subjective paradigm approach to the problem of distribution centers management, that the summarized invention utilizes inter alia, the technique of data mining. We now point out, firstly, that the technique of data mining is of such complexity and utility, that as a technique, in and of itself, it cannot be used in any way as an available candidate solution for enhancing distribution centers management, to the extent that the problem of distribution centers management is only approached within the realm of the human-subjective solution to distribution centers management. Moreover, to the extent that the present invention uses computer techniques including e.g., data mining techniques, to an end of solving a problem of distribution centers management, it is not in general obvious within the nominal context of the problem as we have defined it and the technique of data mining, how they are in fact to be brought into relationship in order to provide a pragmatic solution to the problem of distribution centers management. It is, rather, an aspect of the novelty and unobviousness of the present invention that it discloses, on the one hand, the possibility for using the technique of data mining within the context of distribution centers management, and, moreover, on the other hand, discloses illustrative methodology that is required to in fact pragmatically bring the technique of data mining to bear on the actuality of solving the problem of distribution centers management.

BRIEF DESCRIPTION OF THE DRAWINGS

The invention is illustrated in the accompanying drawing, in which.

DETAILED DESCRIPTION OF THE PRESENT INVENTION

The detailed description of the present invention proceeds by tracing through three quintessential method steps, summarized above, that fairly capture the invention in all its sundry aspects. To this end, attention is directed to the flowcharts and neural networks of FIGS. 1 through 4, which can provide enablement of the three method steps.

Figure 1:
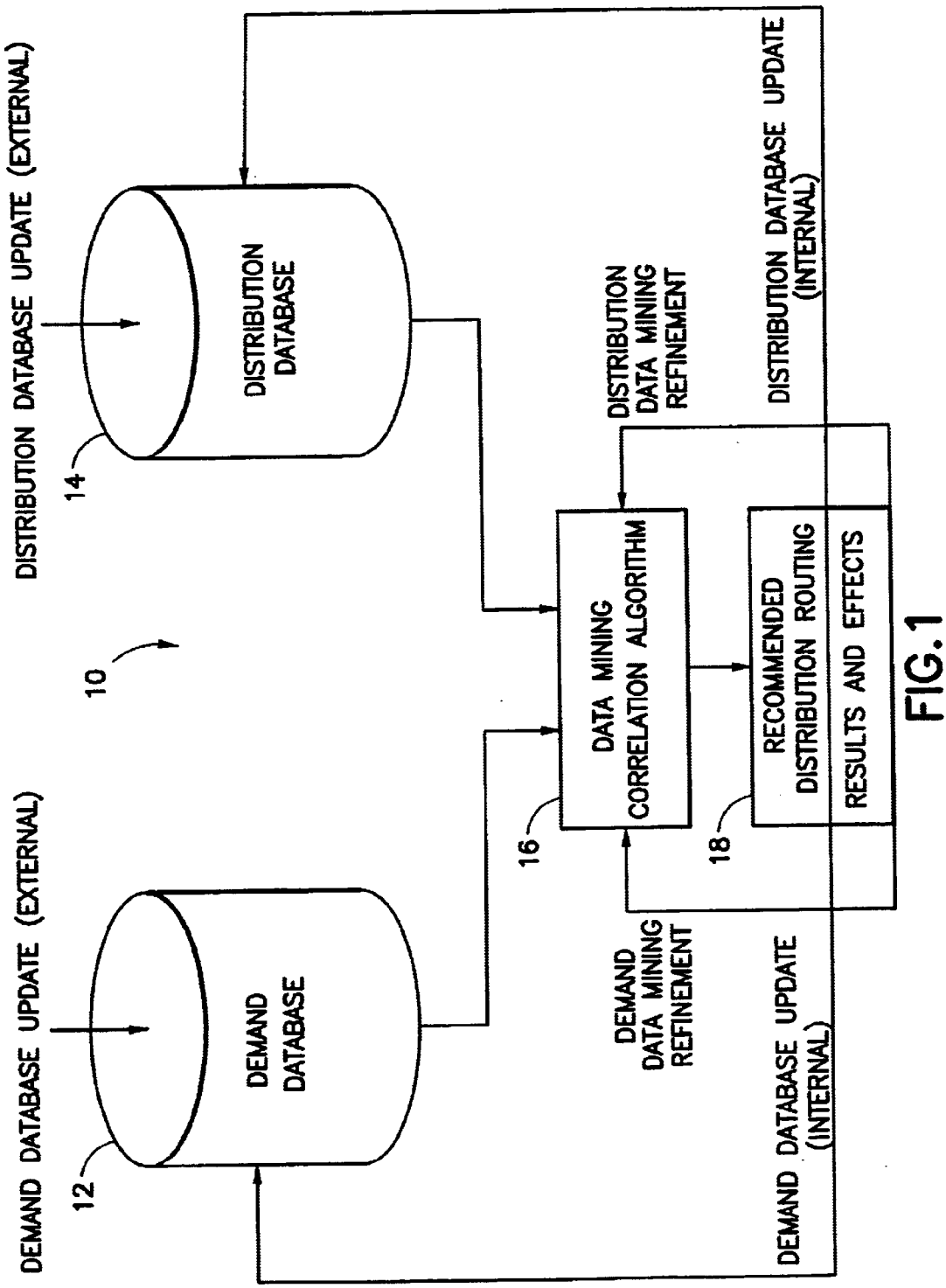
FIG. 1 provides an illustrative flowchart comprehending overall realization of the method of the present invention.

FIG. 1, numerals 10–18, illustratively captures the overall spirit of the present invention. In particular, the FIG. 1 flowchart (10) shows a demand database (12) comprising a compendium of individual demand history, and a distribution database (14) comprising a compendium of at least one of distribution centers management solutions, distribution centers information, and distribution centers diagnostics. Those skilled in the art will have no difficulty, having regard to their own knowledge and this disclosure, in creating or updating the databases (12, 14) e.g., conventional techniques can be used to this end. FIG. 1 also shows the outputs of the demand database (12) and distribution database (14) input to a data mining correlation algorithm box (16). The data mining algorithm can interrogate the information captured and/or updated in the demand and distribution databases (12, 14), and can generate an output data stream (18) correlating demand problem with distribution solution. Note that the output of the data mining algorithm can be most advantageously, self-reflexively, fed as a subsequent input to at least one of the demand database (12), the distribution database (14), and the data mining correlation algorithm (16).

Figure 2:
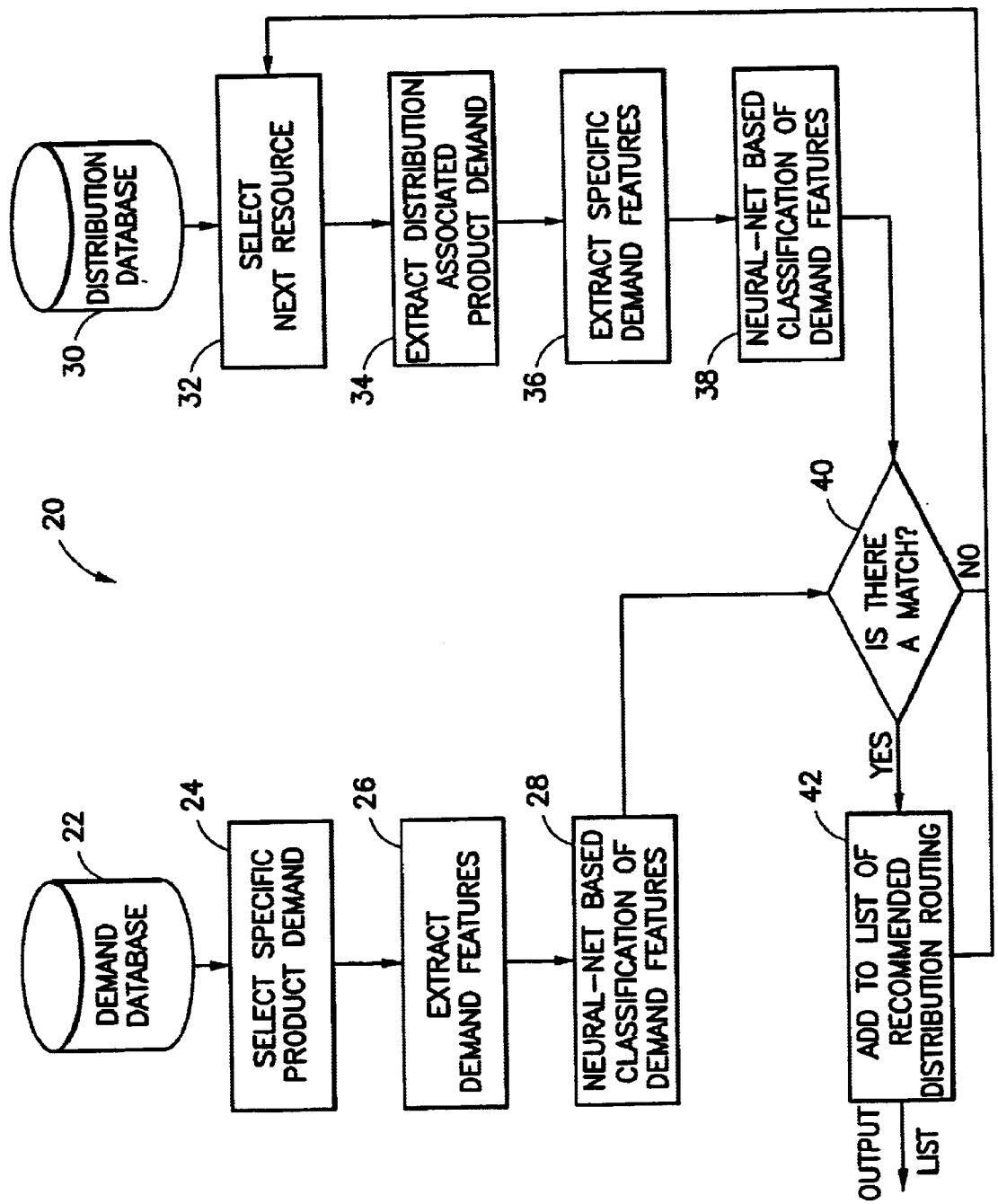
FIG. 2 provides an illustrative flowchart of details comprehended in the FIG. 1 flowchart.

Attention is now directed to FIG. 2, which provides a flowchart (20–42) that recapitulates some of the FIG. 1 flowchart information, but adds particulars on the immediate correlation functionalities required of a data mining correlation algorithm. For illustrative purposes, FIG. 2 comprehends the data mining correlation algorithm as a neural-net based classification of demand features, e.g., wherein a demand feature for say, men's shirts, may include shirt style, size, color, current local inventory, expected demand by week, etc.

Figure 3:
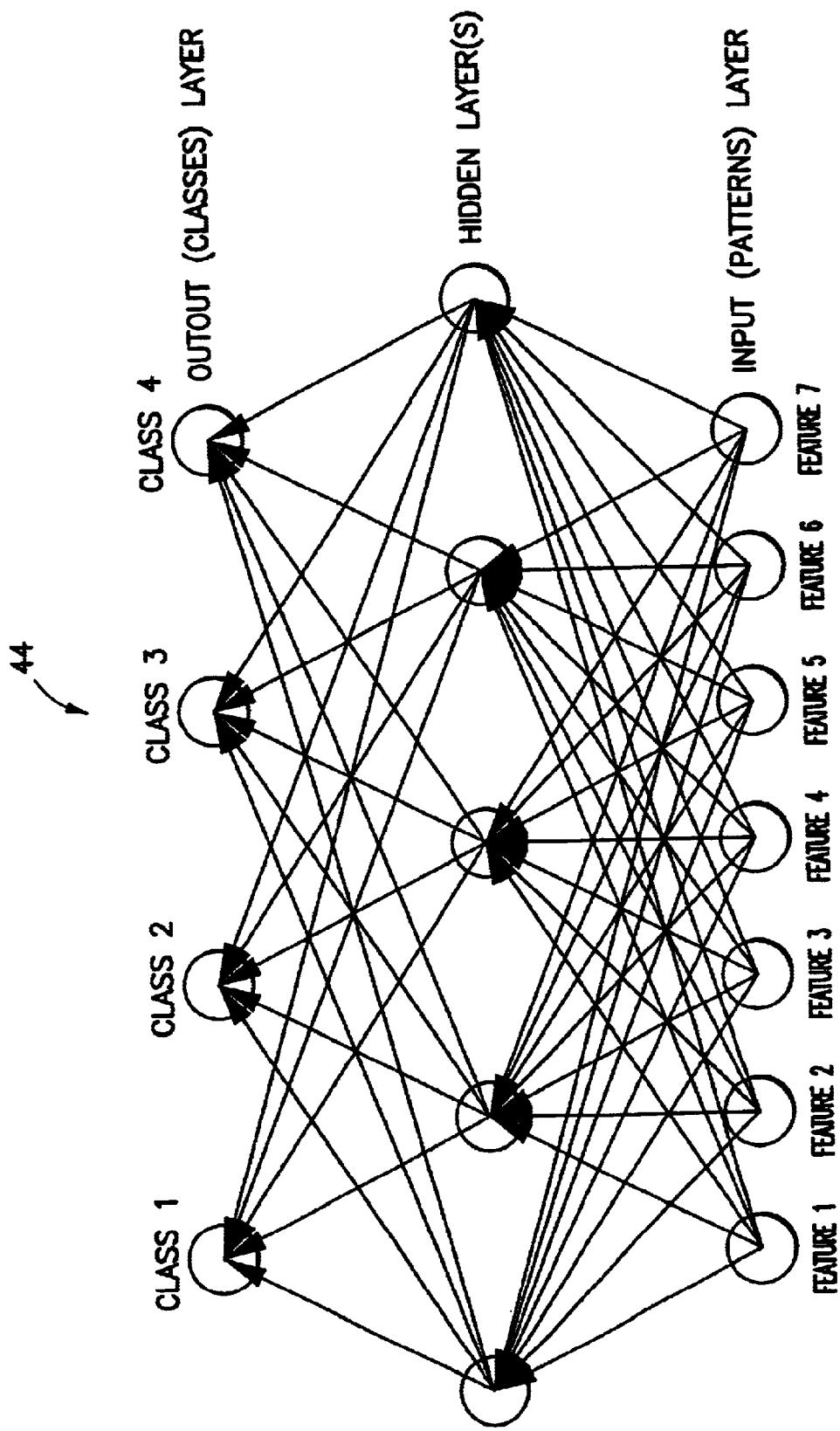
FIG. 3 shows a neural network that may be used in realization of the FIGS. 1 and 2 data mining algorithm.
Figure 4:
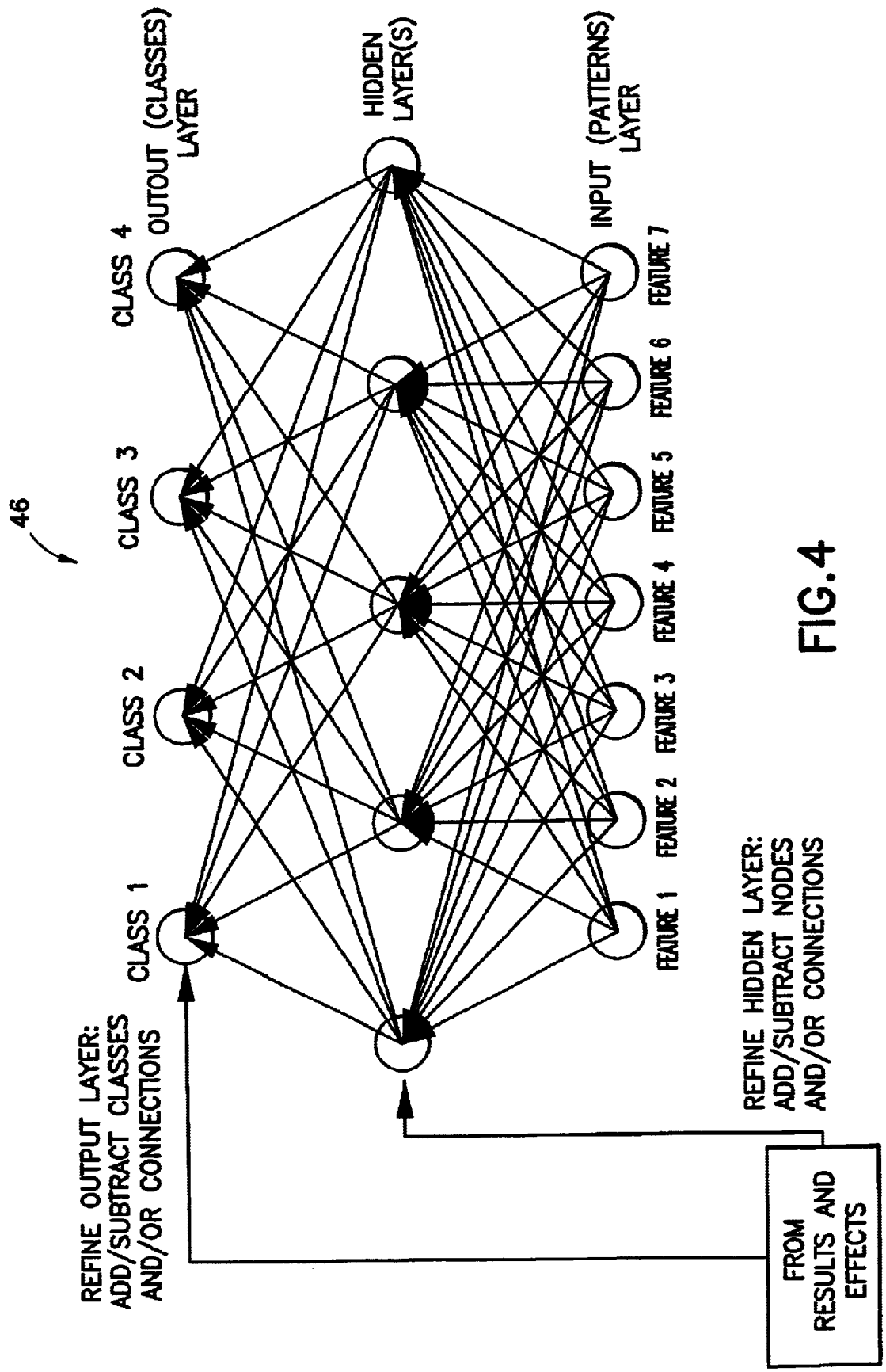
FIG. 4 shows further illustrative refinements of the FIG. 3 neural network.

FIG. 3, in turn, shows a neural-net (44) that may be used in realization of the FIGS. 1 and 2 data mining correlation algorithm. Note the reference to classes which represent classification of input features. The FIG. 3 neural-net (44) in turn, may be advantageously refined, as shown in the FIG. 4 neural-net (46), to capture the self-reflexive capabilities of the present invention, as elaborated above.

It is well understood that the computer system and method of the present invention can be implemented using a plurality of separate dedicated or programmable integrated or other electronic circuits or devices (e.g., hardwired or logic circuits such as discrete element circuits, or programmable logic devices such as PLDs, PLAs, PALs, or the like). A suitably programmed general purpose computer, e.g., a microprocessor, microcontroller, or other processor devices (CPU or MPU), either alone or in conjuction with one or more peripheral (e.g., integrated circuit) data and signal processing devices can be used to implement the invention. In general, any device or assembly of devices on which a finite state machine capable of implementing the flow charts shown in the figures can be used as a controller with the invention.

What is claimed:

1. A computer method comprising:
   providing a demand database comprising a compendium of individual demand history;
   providing a distribution database comprising a compendium of at least one of distribution center management solutions, distribution center information, and distribution center diagnostics; and
   employing a data mining technique for interrogating said demand and distribution databases, and generating an output data stream, said output data stream correlating a demand problem with a distribution solution.

2. A method according to claim 1, further comprising: updating the demand database.

3. A method according to claim 1, further comprising: updating the distribution database.

4. A method according to claim 1, wherein said data mining technique comprises a neural network classification.

5. The method according to claim 1, wherein said data mining technique is refined based on said output data stream.

6. The method according to claim 1, wherein said compendium of individual demand history comprises responses to historical distribution situations.

7. The method according to claim 1, wherein said output data stream comprises a list of recommended distribution routing.

8. The method according to claim 1, wherein said data mining technique comprises at least one function for producing output data selected from the group consisting of classification-neural, classification-tree, clustering-geographic, clustering-neural, factor analysis, principal component analysis, and expert systems.

9. The method according to claim 1, wherein said data mining technique comprises a data mining correlation algorithm.

10. A method according to claim 2, wherein said demand database is updated to include the results of said employing said data mining technique.

11. A method according to claim 3, wherein said distribution database is updated to include the results of said employing said data mining technique.

12. A method according to claim 2, further comprising:
refining said data mining technique in cognizance of pattern changes embedded in each database as a consequence of said updating the demand database.

13. A method according to claim 3, further comprising:
refining said data mining technique in cognizance of pattern changes embedded in each database as a consequence of said updating the distribution database.

14. The method according to claim 4, wherein said neural network classification comprises a neural network classification of demand features.

15. The method according to claim 14, wherein said demand features comprise one of style, size, color, current local inventory, and expected demand by week.

16. A program storage device readable by machine, tangibly embodying a program of instructions executable by the machine to perform a method for providing an interactive distribution center management database, the method comprising:

providing a demand database comprising a compendium of individual demand history;

providing a distribution database comprising a compendium of at least one of distribution center management solutions, distribution center information, and distribution center diagnostics; and employing a data mining technique for interrogating said demand and distribution databases, and generating an output data stream, said output data stream correlating a demand problem with distribution solution.

17. A computer comprising:

an input device for inputting a demand database comprising a compendium of individual demand history, and inputting a distribution database comprising a compendium of at least one of distributing center management solutions, distribution center information, and distribution center diagnostics; and a processor for employing a data mining technique for interrogating said demand and distribution databases, and generating an output data stream, said output data stream correlating a demand problem with a distribution solution.

18. The computer according to claim 17, wherein said data mining technique is refined based on said output data stream.

* * * * *